United States Patent Office

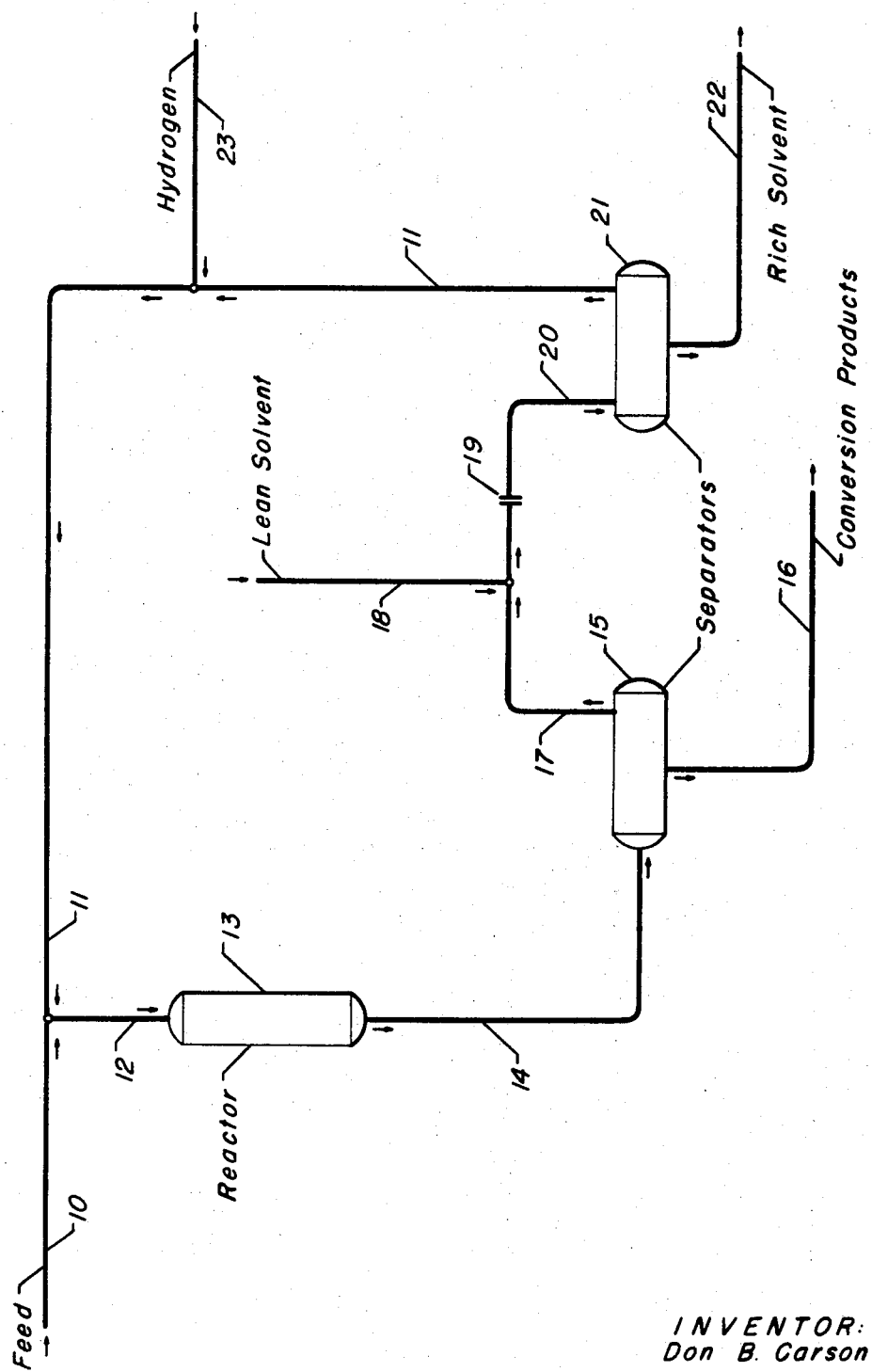

3,417,011
Patented Dec. 17, 1968

3,417,011
HYDROCARBON CONVERSION PROCESS EMPLOYING PURIFIED RECYCLE HYDROGEN
Don B. Carson, Mount Prospect, Ill., assignor to Universal Oil Products Company, Des Plaines, Ill., a corporation of Delaware
Filed Jan. 3, 1967, Ser. No. 607,029
7 Claims. (Cl. 208—108)

ABSTRACT OF THE DISCLOSURE

Process for hydrocracking hydrocarbons to lower molecular weight materials in the presence of recycle hydrogen which has been purified by high pressure absorption using a mixture of polyalkylpolyethylene glycol ethers containing from 2 to 6 ethylene units per molecule as the main component of the absorbent composition and a $C_8$–$C_{12}$ paraffin hydrocarbon. The contacting between the impure hydrogen stream and the absorbent is performed, preferably, as a single stage using an in-line mixer device at a locus between two high pressure separators.

---

This invention relates to a process for hydrocarbon conversion. It also relates to a method for producing lower molecular weight products via hydrocracking. It specifically relates to a method for producing high-purity hydrogen for use in a hydrogenating reaction.

The use of hydrocracking has been known to those skilled in the art as a means for gasoline manufacture both alone and in combination with other processing steps such as catalytic reforming, catalytic alkylation, etc. The hydrocracking reaction has the function of converting hydrocarbon materials such as naphtha, reduced heavy crude oil, still tar, and the like, into more valuable products by cracking these feed hydrocarbons in the presence of hydrogen using a catalyst to effectuate the reaction. Since high-purity hydrogen is a requirement for an efficient hydrocracking reaction, there is a need to produce hydrogen of the requisite purity from sources within a petroleum refinery. For example, a typical source of hydrogen is the off-gas from a catalytic reforming unit; however, this hydrogen-containing stream is frequently of such low purity with respect to hydrogen that extremely large amounts of reformer off-gas must be circulated within the reaction zone circuit in order to maintain the hydrogen partial pressure within the reaction zone at a proper level.

During the hydrocracking reaction in addition to the desired liquid conversion products there is produced a small amount of normally gaseous light hydrocarbons and acid gas such as hydrogen sulfide which act as contaminants in the recycle hydrogen stream. These light hydrocarbons and acid gas tend to build up in the system with the result that the purity of the recycle hydrogen begins to decrease to the point where the efficiency of the hydrocracking reaction begins to decline. Therefore, it is desirable to purify the hydrogen recycle stream, preferably, within the hydrocracking reaction zone circuit, prior to re-entry to the reactor for further reaction.

Accordingly, it is an object of this invention to provide a method for the conversion of hydrocarbons.

It is another object of this invention to provide a method for producing lower molecular weight products via an improved hydrocracking process.

Still another object of this invention is to provide a process for producing high-purity hydrogen for use in a hydrogenating reaction.

It is a specific object of this invention to provide a process for hydrogenating hydrocarbons in a more facile and economical manner.

Therefore, in accordance with one embodiment of the present invention, there is provided a process for hydrogenating hydrocarbons which comprises introducing feed hydrocarbons into a conversion zone in the presence of hydrogen under hydrogenating conditions, passing the effluent from said zone into a first separation means at relatively high pressure to produce a gaseous fraction comprising hydrogen contaminated with light hydrocarbons and acid gas, and normally liquid hydrogenated fraction; admixing said gaseous fraction under absorption conditions with an absorbent selective for acid gas and light hydrocarbons; separating said mixture at relatively high pressure into a hydrogen stream having reduced contaminant content, and a liquid stream comprising absorbent having contaminants dissolved therein; and, recovering said normally liquid fraction.

A particular embodiment of this invention involves the process hereinabove wherein said absorbent comprises a major proportion of polyglycol ether, and a minor proportion of a hydrocarbon at least partially soluble in said ether.

A specific embodiment of this invention involves the process described hereinabove wherein said acid gas comprises hydrogen sulfide; said absorbent comprises by volume 50% to 90% polyalkylpolyethylene glycol ether, 0% to 48% alkylamine having from 6 to 18 carbon atoms per molecule, and 2% to 50% hydrocarbons at least partially soluble in said ether; and, said relatively high pressure is from 1000 p.s.i.g. to 3000 p.s.i.g.

Hydrogenating is a general term known to those skilled in the art, and as used herein, includes hydrocracking wherein hydrocarbon feed stocks which are of relatively high molecular weight are converted to mixtures of hydrocarbons of lower molecular weight. Generally, the conversion reaction is carried out at an elevated temperature in the presence of a catalyst and hydrogen-containing gas. Typically, the conditions for converting hydrocarbon feed stocks into lighter (or lower boiling) hydrocarbons include a pressure in excess of 1500 p.s.i.g. with temperatures and space velocities being conventional as those skilled in the art well know.

The hydrocarbon feed stocks which may be satisfactorily converted in the practice of the present invention may have a wide range of composition and may contain large concentrations of saturate hydrocarbons in addition to aromatic hydrocarbons. In the hydrocracking reaction, for example, saturates are hydrocracked to gasoline boiling range paraffinic hydrocarbons containing a greater than equilibrium concentration of isoparaffin hydrocarbons in the products; while in the case of polynuclear aromatics used as the feed stock, these are partially hydrogenated and, then, the hydrogenated ring-portion is hydrocracked to afford alkyl-substituted benzenes and an isoparaffin hydrocarbon. Most generally, for the hydrogenating reaction, the feed stock will range from naphtha and kerosene through the light and heavy gas oils; although, more recently, the reduced crudes and heavy residuums, commonly called "black oils," have been successfully hydrogenated to more valuable products. A particularly suitable feed stock is one containing paraffinic hydrocarbons of at least 5 carbon atoms per molecule and having an upper boiling point within the range of from 600° F. to 1100° F.

Product yields from the process of the present invention are dependent upon the nature of the feed stock, process conditions, availability of hydrogen, and the catalyst employed in the process. It should be noted, however, that the hydrocracking conditions and the specific catalyst used, per se, form actually no part of the present invention except within the concepts described herein.

The catalyst employed in the hydrocracking reaction zone may be selected from the various well known hydrocracking catalysts which typically comprise a hydrogenation component and a solid acidic hydrocracking component, preferably, the hydrocracking catalyst further comprises a minor amount of an activity-controlling material which effectively provides a balance in the hydrogenation activity relative to the acidity during the overall conversion reaction. The catalyst so constituted serves a dual function; that is, the catalyst is non-sensitive to the presence of substantial quantities of nitrogenous compounds and sulfurous compounds while at the same time, it is capable of effecting the destructive removal thereof and also of converting at least a portion of those hydrocarbons boiling in the upper range of the feed stock; that is, boiling in excess of 600° F. to about 700° F.

The catalyst used in the practice of this invention for the hydrocracking reaction preferably also will comprise minor amounts of nickel, e.g., from about 0.5% to 10% by weight nickel is distinctly preferred as the catalytic component, on a silica-alumina support. Therefore, as used herein, the preferred catalyst composition for the hydrocracking reaction will be referred to as a nickel-containing catalyst. Other hydrocracking catalysts known to those skilled in the art may also be used in some cases with satisfactory results in the practice of this invention.

The catalytic composite for utilization in the hydrocracking reaction may be manufactured in any suitable manner known to those skilled in the art. Thus, where the catalyst utilized contains nickel, the method of preparation generally involves; first, forming an aqueous solution of water-soluble compound of the desired metals, such as nickel nitrate and nickel carbonate; then, the alumina particles serving as the carrier material are comingled with the aforementioned aqueous solution and subsequently dried at a temperature of about 200° F. The dried composite is oxidized in an oxidizing atmosphere, such as air, at an elevated temperature of from 1100° F. to about 1700° F. for a period of from about 2 to 8 hours. The exact manner of formulating the catalytic composite is not critical to the invention and is well known to those skilled in the art.

The process conditions which are employed in the present invention for the hydrocracking reaction can be selected over a relatively wide range and are of necessity correlated according to the nature of the feed stock and according to the particular catalyst employed so as to produce a desired conversion; that is, the percentage of feed stock converted to desirable products. Satisfactory conversions are obtained with the herein described feed stocks using the preferred nickel-containing catalyst at pressures in the range from about 400 p.s.i.g. to 10,000 p.s.i.g., preferably from 1000 p.s.i.g. to 3000 p.s.i.g.; liquid hourly space velocity from 0.1 to 10, preferably from 0.7 to 3; and hydrogen-to-oil ratio between 1000 and 30,000 standard cubic feet per barrel (s.c.f./B.), preferably between 5000 and 15,000 s.c.f./b. In each instance, it is important in the practice of this invention that the process conditions be chosen in the hydrocracking step which are sufficient to effect hydrocracking of the feed materials measured by the production, for example, of normally gaseous paraffinic hydrocarbons comprising $C_1$ to $C_3$ hydrocarbons, i.e., the conditions are chosen so that less than 5% by weight, preferably from 2% to 3% by weight of $C_1$ to $C_3$ hydrocarbons are produced.

Hydrogen is consumed in the hydrogenating reaction; therefore, it is necessary to maintain an excess of hydrogen in the reaction zone. A particularly useful place to obtain hydrogen is from a catalytic reforming operation which is a net producer of hydrogen. Normally, the hydrogen gas produced by catalytic reforming is impure in that it contains only from 40% to 70% on a mol. basis, hydrogen. In another fashion, the normally gaseous fraction separated from the effluent of the hydrogenating reaction zone contains primarily hydrogen which is contaminated with light hydrocarbons and acid gas such as hydrogen sulfide. In normal operation, the hydrogen gas is separated from the effluent and, preferably, is recycled to the reaction zone. However, as previously mentioned hereinabove with reference to the embodiments of the present invention, the hydrogen gas frequently is contaminated with light hydrocarbons and acid gas.

Therefore, in the practice of this invention, the hydrogen gas from the reactor effluent stream is cooled and scrubbed with an absorbent composition selective for the light hydrocarbons and acid gas. The mixture of hydrogen and rich-absorbent is passed into a relatively high pressure separator wherein purified hydrogen gas is separated from the rich-absorbent composition. The purified hydrogen gas is then, preferably, recycled to the reactor as more fully discussed hereinbelow.

The polyglycol ether compound which acts as one component of the absorption medium and/or as the carrying agent for the desired organic amine, if any, is preferably selected to provide a composition which is liquid during contact with and separation from hydrogen gas. The preferred glycol ether compound also is relatively non-viscous material having a relatively high boiling point so that it will remain in substantially liquid phase at the temperatures and pressures utilized in the present process. The preferred glycol ether is also further selected to provide a liquid medium which is highly miscible with the organic amine, if any, and with the hydrocarbon components present in the contaminated gas which is being scrubbed in the practice of the present invention.

As will be more fully discussed hereinbelow, such preferred ether must also be at least partially miscible with the hydrocarbon portion of the absorption medium composition.

Thus, one of the most useful and readily available classes of glycol ether compounds for use in the present invention are members of the polyalkylpolyethylene glycol family generally containing from 2 to 6 ethylene units per molecule. Examples of this class of suitable ethers include dimethoxytetraethylene glycol, dimethoxytriethylene glycol, dibutoxytriethylene glycol, dibutoxydiethylene glycol, dipropoxytetraethylene glycol, dipropoxytriethylene glycol, dipropoxydiethylene glycol, and appropriate mixtures thereof. Such ethers generally boil in the range of from 200° C. to 300° C. The distinctly preferred ether is a mixture comprising dimethoxytriethylene glycol and dimethoxytetraethylene glycol, in approximately molar proportions by weight since this mixture has outstanding selectivity for hydrocarbon contaminants as well as acid gas contaminants contained in the effluent hydrogen gas stream from a hydrocracking process. The ether compound is utilized in its substantially anhydrous condition, e.g. less than 0.5% by weight water, so that any water present in the feed gas mixture is also removed by the processing scheme embodied in the present process. In some cases, however, the water content of the glycol ether may be as high as about 8% of the final composition.

Depending upon the extent to which acid gases such as hydrogen sulfide are present in the separated impure hydrogen stream and the degree to which these gases are to be removed it may be desirable to include as a component of the absorption medium an organic amine. Generally, the organic amine is selected from the class of compounds characterized as organic bases containing one or more amino groups attached to a hydrocarbon group. The preferred organic amines which may be used in the present invention are compounds having a relatively low vapor pressure so that substantial vaporization of the amine does not occur under the conditions of temperature and pressure used during the subsequent absorption medium regeneration step. Suitable organic amines for this purpose may be selected from the aliphatic, aromatic, naphthenic, and hetrocyclic amines, as well as from the alkanol amines containing 1 or more amino and/or hydroxyl groups per molecule. The amine may also be a primary, secondary, or tertiary amine, the polyamines, or the alkanol amines, with the secondary amines being particularly useful in the present absorbent compositions. Typical secondary amines utilizable in the present invention include compounds such as dipropylamine, diisopropylamine, isopropyl - n - propylamine, n-butylmethylamine, n-butylisopropylamine, sec-butylmethylamine, sec-butyl-tert-butylamine, di-isobutylamine, di-n-hexylamine, di - cyclohexylamine, propylnonylamine, dioctylamine, tolylisopropylamine, N-monomethyl aniline, morpholine, and homologs and analogs thereof. It is distinctly preferred to use diisopropylamine as the organic amine compound.

The required hydrocarbon constituent of the present absorbent composition is generally selected from a class of hydrocarbons containing from about 6 to 18 carbon atoms per molecule, preferably from 8 to 12 carbon atoms, and which is at least partially soluble in the class of glycol ethers selected for use in the present invention. The general class of hydrocarbons suitable for use herein include aromatic hydrocarbons such as benzene, toluene, etc.; olefinic hydrocarbons such as hexene, heptene, cyclohexene, and the like; and naphthenic hydrocarbons including paraffinic hydrocarbons, such as methylcyclopentane, cyclohexane, iso-octane, and the like. It is distinctly preferred that the hydrocarbon be selected from the group of naphthenic hydrocarbons within the above group. Excellent results are obtained by using the relatively high molecular weight paraffinic hydrocarbons, i.e. from 8 to 12 carbon atoms per molecule, such as the octanes, e.g. iso-octane and the nonanes. It is to be understood, however, that the hydrocarbon constituent of the preferred absorbent composition can be any paraffinic-containing hydrocarbon stream which can be characterized by the substantial absence of both aromatic hydrocarbons and olefinic hydrocarbons. It follows, therefore, that the preferred paraffinic hydrocarbon-containing stream which is an integral part of the absorbent composition may be formulated in some cases, in situ, by operating the present invention as herein described to tailor the absorbent composition such that it contains sufficient quantities of paraffinic hydrocarbons at least part of which were originally present in the hydrogen-containing gas stream to be treated. Preferably, however, the hydrocarbon component is initially injected into the absorbent composition during the regeneration thereof.

The hydrocarbon component of the absorbent composition is present in an amount corresponding to 2% to 50% by weight of the resulting lean absorbent composition. It is to be noted that the hydrocarbon component of the composition may be added to the process of the present invention or may be obtained at least in part from the hydrocarbons present as a feed gas mixture which is to be purified. The extent of hydrocarbon present in the composition depends upon the particular contaminant to be removed. For example, if a high concentration of $H_2S$ is to be removed the hydrocarbon should be present in an amount from 2% to 50%, preferably from 5% to 30%, and typically about 10%. On the other hand, for removal of large amounts of methane, the hydrocarbon should be present in an amount from 5% to 50%, preferably from 20% to 50%, and typically about 30%.

The glycol ether constituent of the present absorbent composition is present in an amount corresponding to 50% to 90% by weight of the resulting lean absorbent composition. Similarly, the amount of organic amine present, if any, ranges in an amount corresponding to from 0% to 48% by weight of the resulting lean absorbent composition. Those skilled in the art will know from the teachings contained herein how to alter the composition of the absorbent so that optimum results may be obtained. For most commercial uses, a typical absorbent composition would include 50% preferred ether mixture, 40% diisopropylamine, and 10% isooctane. Another preferred absorbent composition comprises 50% to 90% of a mixture comprising dimethoxytriethylene glycol ether and dimethoxytetraethylene glycol ether; and 10% to 50% hydrocarbon comprising $C_8$ to $C_{12}$ paraffinic hydrocarbons.

The invention is more specifically described with reference to the accompanying drawing which is a diagrammatic flow sheet illustrating the preferred arrangement of apparatus for conducting the present process.

Referring now to the drawing, a hydrocarbon feed mixture comprising a fraction boiling between 400° F. and 1000° F. is fed into the process via line 10 wherein it is admixed with a hydrogen-containing stream comprising recycle hydrogen via line 11. The feed mixture plus hydrogen, in an amount of about 5000 s.c.f./b. is charged via line 12 into catalytic hydrogenating zone 13 in contact with a nickel-containing catalyst. Typically, the operating conditions maintained in hydrogenating zone 13 include a temperature of about 700° F., a liquid hourly space velocity of about 0.75, and a pressure of about 2000 p.s.i.g. These conditions are sufficient to produce an effluent stream containing normally liquid hydrogenated products; that is, a product stream containing lower boiling materials than the feed material; and, a hydrogen-containing stream contaminated with light hydrocarbons and acid gases.

These various components comprise the effluent from hydrocracking zone 13 and are subsequently passed via line 14 into separation zone 16. Hydrogen gas comprising by mol hydrogen 56%, methane 25%, ethane 9%, propane 3.5%, butanes and heavier 2.1%, hydrogen sulfide 3.6%, carbon dioxide 0.6% and nitrogen 0.2%, is separated from the effluent via line 17. The desired conversion product-containing stream of effluent is removed from separator 15 via line 16 for recovery of the desired product, typically, by fractionation means.

The impure hydrogen stream in line 17 is at a temperature from 100° F. to 200° F., typically, about 140° F., and then contacted with an absorbent composition comprising 50% of the previously mentioned distinctly preferred ether mixture, 40% diisopropylamine, and 10% iso-octane, via line 18. The absorbent and impure hydrogen stream are mixed in an amount from 0.005 to 2.0 cubic feet absorbent per standard cubic foot of gas to be dissolved, preferably from 0.05 to 0.5 c.f./s.c.f., typically about 0.1 c.f./s.c.f. and passed through in-line mixer 19 through line 20 into separator 21. It is to be noted at this point that the operating conditions in separator 21 and separator 15 are similar in pressure, e.g. about 2000 p.s.i.g., although separator 21 may be at a lower temperature. The material in line 17 and line 18 have been cooled by means not shown in order to improve the effectiveness of hydrocarbon removal and acid gas removal from the hydrogen-containing stream. Operating conditions within separator 21 include a relatively high pressure of from 1000 p.s.i.g. to 3000 p.s.i.g., preferably from 1000 p.s.i.g. to 2000 p.s.i.g., and, more preferably, of approximately the same pressure as was present in separator 15. The only difference in pressure between the two separators is the normal pressure drop through the system including any heat exchangers, valves, mixing devices, and the like. The temperature in separator 21, generally, is in the range from 50° F. to 300° F., preferably from 120° F. to 150° F., whereby at least a major proportion of the non-hydrogen contaminants in the feed mixture from line 17 are absorbed. From the top of separator 21 a concentrated hydrogen stream, e.g. about 75 mol percent, is removed via line 11.

The hydrocarbon-rich and acid gas-rich absorbent is removed from separator 21 via line 22 for further processing in accordance with means well known to those skilled in the art. Generally, the rich absorbent is passed into a fractionation train wherein the light hydrocarbons and acid gas components are stripped from the absorbent composition and the resulting regenerated absorbent is recycled to the process via line 18. Additional fresh solvent may be added to the system by means not shown as is needed to maintain the proper composition of the absorbent.

It is to be noted that the purified hydrogen stream in line 11 is preferably recycled to the reactor in admixture with incoming feed. Additional sources of hydrogen may be added to the system, as needed, via line 23, preferably, from a catalytic reforming operation which has a net production of hydrogen which is available for this purpose.

Therefore, it can be seen that the present invention is based on the concept of utilizing a two-stage separation of the effluent wherein an absorbent composition selective for the contaminants in the hydrogen gas stream is admixed with the impure hydrogen stream at a point between the two separators in a facile manner, such that hydrogen gas is purified suitable for reuse in the hydrogenation reaction zone.

The method of this invention is suitable for any process involving the contacting of hydrogen and liquid hydrocarbons wherein the hydrogen recycle gas becomes contaminated with acid gas and/or light conversion products such as light hydrocarbons. In the practice of this invention broad operating conditions for hydrogenation, including hydrocracking, may be chosen. In some instances hydrogenation for removal of sulfur compounds may be the desired result but the nature of the feedstock also requires that simultaneously some cracking takes place. This latter situation describes the processing of "black oils" for desulfurization purposes. Typical hydrogenating conditions include, for desulfurization of lubricating oils, a temperature from 400° F. to 800° F. and a pressure from 150 p.s.i.g. to 10,000 p.s.ig., etc., as those skilled in the art know well.

Any suitable granular solid hydrogenation catalyst can be employed in the hydrogenation process according to the invention, e.g. cobalt, molybdenum, platinum, iron, nickel, oxides or sulfides of such metals, etc. Conventional carriers of the catalyst can also be employed, e.g. silica gel, alumina, bauxite, clay, activated carbon, etc.

The invention claimed:
1. Process for hydrocracking hydrocarbons which comprises introducing feed hydrocarbons into a conversion zone in the presence of hydrogen under hydrogenating conditions; passing the effluent from said zone into first separation means at relatively high pressure to produce a gaseous fraction comprising hydrogen contaminated with light hydrocarbons and acid gas, and a normally liquid hydrogenated fraction; admixing said gaseous fraction under absorption conditions with a liquid absorbent mixture selective for acid gas and light hydrocarbons; separating said admixture at *substantially said* relatively high pressure into a hydrogen stream having reduced contaminant content and a liquid stream comprising absorbent having contaminants dissolved therein; and recovering said normally liquid fraction.

2. Process according to claim 1 wherein said acid gas comprises hydrogen sulfide; said absorbent comprises by volume 50% to 90% polyalkylpolyethylene glycol ether, 0% to 48% alkylamine having from 6 to 18 carbon atoms per molecule, and 2% to 50% hydrocarbon at least partially soluble in said ether; and said relatively high pressure is from 1000 p.s.i.g. to 3000 p.s.i.g.

3. Process according to claim 2 wherein said absorbent comprises 50% to 90% of a mixture comprising dimethoxytriethylene glycol ether and dimethoxytetraethylene glycol ether; and 10% to 50% hydrocarbon comprising $C_8$ to $C_{12}$ paraffinic hydrocarbons.

4. Process for hydrocracking hydrocarbons which comprises the steps of:
(a) introducing feed hydrocarbons into a conversion zone in the presence of hydrogen under hydrogenating conditions including a relatively high pressure from 1,000 p.s.i.g. to 3,000 p.s.i.g.;
(b) passing the effluent from said conversion zone into separation means at substantially said high pressure therein producing a gaseous fraction comprising hydrogen contaminated with light hydrocarbons and acid gas, and a normally liquid fraction comprising converted hydrocarbons;
(c) introducing said gaseous fraction from Step (b) directly into an absorption zone maintained under absorption conditions including substantially said relatively high pressure in the presence of a liquid absorbent mixture selective for light hydrocarbons and acid gas;
(d) removing from said absorption zone a gaseous stream comprising hydrogen having reduced contaminant content and a liquid stream comprising rich absorbent comprising at least part of said contaminants;
(e) passing at least a portion of said gaseous stream from Step (d) to Step (a) as part of said hydrogen therein; and
(f) recovering said normally liquid fraction of Step (b).

5. Process according to claim 4 wherein said absorbent comprises a major proportion of polyglycol ether and a minor proportion of a hydrocarbon comprising $C_8$ to $C_{12}$ paraffinic hydrocarbons.

6. Process according to claim 4 wherein said acid gas comprises hydrogen sulfide and said absorbent comprises by volume 50% to 90% polyalkylpolyethylene glycol ether, 0% to 48% alkylamine having from 6 to 18 carbon atoms per molecule and 2% to 50% hydrocarbon at least partially soluble in said ether.

7. Process for hydrocracking hydrocarbons which comprises the steps of:
(a) introducing feed hydrocarbons into a cracking zone in the presence of hydrogen under hydrocracking conditions including a relatively high pressure from 1,000 p.s.i.g. to 3,000 p.s.i.g.;
(b) passing the effluent from said cracking zone into first separation means at substantially said high pressure therein producing a gaseous fraction comprising hydrogen contaminated with light hydrocarbons and acid gas, and a normally liquid fraction comprising hydrocracked hydrocarbons;
(c) admixing said gaseous fraction from Step (b) with a selective absorbent comprising by volume 50% to 90% polyalkylpolyethylene glycol ether, 0% to 48% alkylamine having from 6 to 18 carbon atoms per molecule, and 2% to 50% hydrocarbon having 8 to 12 carbon atoms per molecule in a mixing zone;
(d) passing the entire admixture from the mixing zone of Step (c) into a second separation zone maintained under separation conditions and removing therefrom a gaseous stream comprising hydrogen having reduced contaminant content and a liquid stream comprising rich absorbent containing at least part of said contaminants;
(e) passing at least a portion of said gaseous stream from Step (d) to Step (a) as part of said hydrogen therein; and
(f) recovering said normally liquid fraction of Step (b).

References Cited

UNITED STATES PATENTS

| 2,938,858 | 5/1960 | Brown | 208—96 |
| 3,206,389 | 9/1965 | Gast et al. | 208—101 |

DELBERT E. GANTZ, *Primary Examiner.*

U.S. Cl. X.R.

208—112; 23—210; 55—48